United States Patent [19]

Tribioli et al.

[11] Patent Number: 5,506,065
[45] Date of Patent: Apr. 9, 1996

[54] ELECTROLYTE-ACTIVATED BATTERY

[75] Inventors: Silvano Tribioli; Vito Giardinelli, both of Leghorn; Francesco Rocco; Franco Cerrano, both of Turin, all of Italy

[73] Assignees: Whitehead Alenia Sistemi Subacquei S.p.A., Genoa; Microtecnica S.p.A., Turin, both of Italy

[21] Appl. No.: 393,861

[22] Filed: Feb. 24, 1995

[30] Foreign Application Priority Data

Feb. 25, 1994 [IT] Italy .................. TO94A0126
Feb. 25, 1994 [IT] Italy .................. TO94A0128

[51] Int. Cl.$^6$ ................................ H01M 6/34
[52] U.S. Cl. ............. 429/119; 429/120; 429/206
[58] Field of Search ..................... 429/119, 206, 429/120

[56] References Cited

U.S. PATENT DOCUMENTS

| | | | |
|---|---|---|---|
| 3,463,671 | 8/1969 | Doll | 429/70 |
| 4,435,487 | 3/1984 | Supelak | 136/160 |
| 4,710,438 | 12/1987 | Leben | 429/119 |

FOREIGN PATENT DOCUMENTS 0307292  3/1989  European Pat. Off. .

Primary Examiner—John S. Maples
Attorney, Agent, or Firm—Ladas & Parry

[57] ABSTRACT

An electrolyte-activated battery, particularly for generating electric energy for the propulsion of underwater systems, and presenting a reservoir, an electrochemical cell, and a system for forming and circulating the electrolyte between the reservoir and the electrochemical cell; the electrolyte forming and circulating system presenting an inlet conduit communicating with the outside environment, a circulating pump, a device for regulating the temperature of the electrolyte at the inlet of the electrochemical cell, and a gas separator located at the outlet of the cell and presenting a liquid phase outlet connectable to the circulating pump, and a gaseous phase outlet connected to an outlet conduit; the inlet and outlet conduits presenting respective closure members facing and rigidly connected to each other so that they are subjected to the same but opposite hydrostatic pressures, and which are movable between a closed position and an open position wherein they are housed inside the respective conduits.

20 Claims, 6 Drawing Sheets

ELECTROLYTE-ACTIVATED BATTERY

BACKGROUND OF THE INVENTION

The present invention relates to an electrolyte-activated alkaline battery, particularly for generating electric energy for the propulsion of underwater systems.

Known batteries of the above type substantially comprise an electrochemical cell; a reservoir containing an anhydrous alkaline compound dissolvable in sea water to form a liquid electrolyte; and a system for forming and circulating the liquid electrolyte between the reservoir and the electrochemical cell.

In actual use, said system communicates with the outside environment (i.e. the sea) via a sea water inlet conduit, and via an outlet conduit located at the outlet of a gas separator and which, among other functions, provides for expelling the gas contained inside the reservoir when this is filled, for expelling the gas (hydrogen) produced during the battery discharge reaction, and for expelling the electrolyte when draining or deactivating the battery.

The inlet and outlet conduits normally present closure members for ensuring airtight sealing during storage of the battery, and which are detached when the system is launched.

For this purpose, various solutions are adopted, and the closure members may consist, for example, of diaphragms pierced by external pressure at immersion or by explosive devices; or plugs which are expelled outwards.

Known batteries of the type briefly described above present several drawbacks, mainly due to the design and opening method of the closure members.

In the case of diaphragms pierced at a predetermined breakthrough pressure, these fail to provide for adapting to different service conditions, and in particular to different launch depths corresponding to different hydrostatic pressures. Conversely, in the case of outwardly expelled closure members, expulsion may be impeded by the hydrostatic pressure to which the members are subjected and which obviously increases alongside an increase in immersion depth. This therefore limits application of the battery, on account of the impossibility of expelling the closure members at the depths involved, for example, in the event the system is launched from a submarine.

Moreover, outward expulsion of the closure members or fragments of them may result in damage or jamming of the launching equipment, and in abortion of the launching operation; while explosive devices are unsatisfactory on account of the noise factor involved.

SUMMARY OF TEE INVENTION

It is an object of the present invention to provide an electrolyte-activated battery designed to overcome the aforementioned drawbacks typically associated with known types.

According to the present invention, there is provided an electrolyte-activated battery, particularly for generating electric energy for the propulsion of underwater systems, and comprising:

an electrochemical cell;

a reservoir containing at least one anhydrous alkaline compound dissolvable in sea water to form a liquid electrolyte; and a system for forming and circulating the liquid electrolyte between the reservoir and the electrochemical cell; said system in turn comprising:

an inlet conduit communicating with the outside environment;

a pump for circulating the electrolyte, and connected at the intake side to the inlet conduit, and at the delivery side to the reservoir;

electrolyte temperature regulating means interposed between the reservoir and the inlet of the electrochemical cell;

a gas separator presenting an inlet connected to the outlet of the electrochemical cell; a gaseous phase outlet; and a liquid phase outlet;

an outlet conduit communicating with the outside environment;

a first closure member for the inlet conduit, and a second closure member for the outlet conduit, which members provide for isolating the battery from the outside environment during storage;

the liquid phase outlet of the gas separator being connectable to the intake side of the pump; and the gaseous phase outlet of the gas separator being connected to the outlet conduit;

characterized in that it comprises rigid connecting means between said first and said second closure member; said closure members defining, with said rigid connecting means, a closure device movable between a position wherein it closes and a position wherein it opens said inlet and outlet conduits; and said closure members being subjected to opposite hydrostatic pressures.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
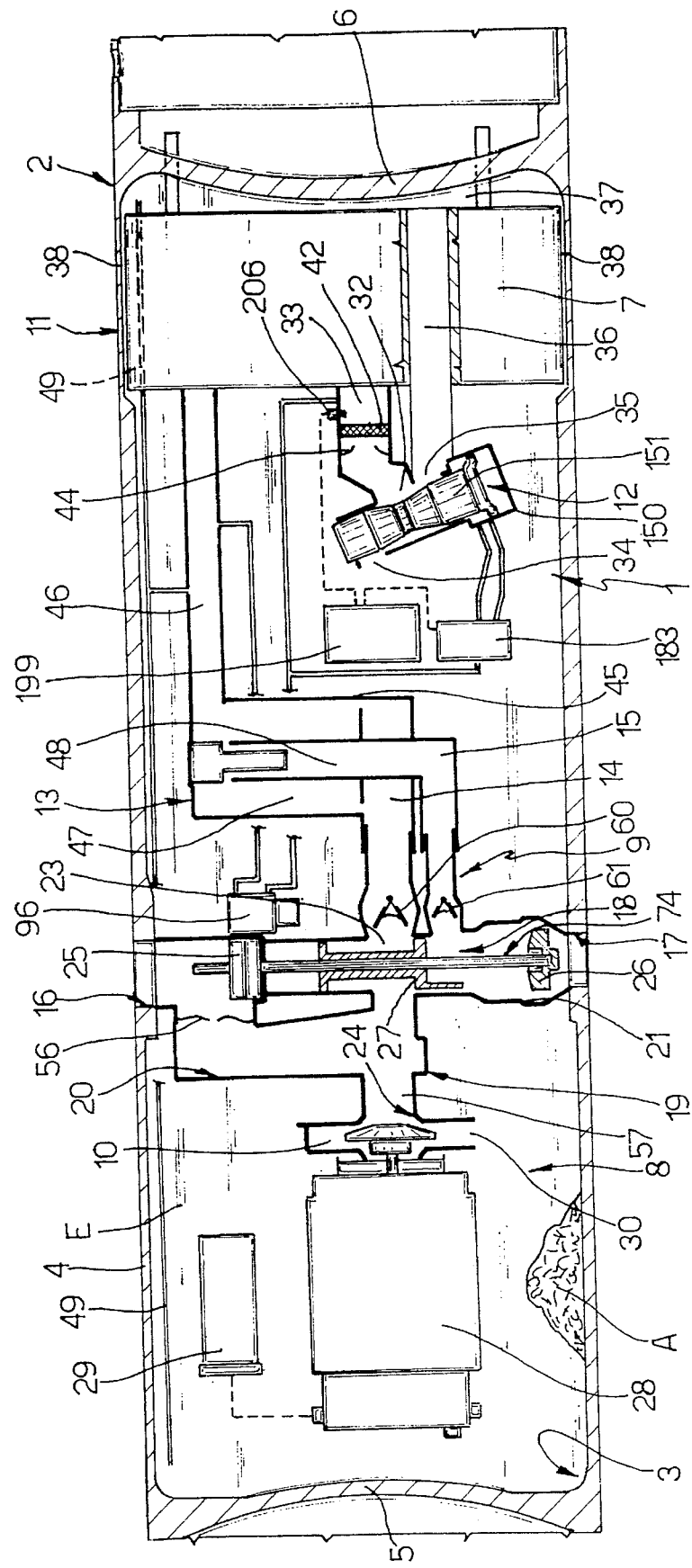
FIG. 1 shows a schematic axial section of a battery in accordance with the teachings of the present invention.

Number 1 in FIG. 1 indicates an alkaline battery activatable for generating electric energy for the propulsion of an underwater system 2 (shown partially), e.g. a torpedo.

Battery 1 is housed inside a compartment 3 of torpedo 2, defined by a substantially cylindrical lateral wall 4 and by two transverse walls 5, 6 of the torpedo.

Battery 1 substantially comprises a known, e.g. Al—AgO, electrochemical cell 7 housed close to one axial end of compartment 3; and a reservoir 8 defined by the remaining portion of compartment 3, and containing an anhydrous alkaline compound A, e.g. soda or potassium carbonate, dissolvable in the sea water fed, in use, into the reservoir to form a liquid electrolyte E.

Battery 1 also comprises a system, housed in reservoir 8 and indicated as a whole by 9, for forming and circulating electrolyte E between reservoir 8 and electrochemical cell 7.

System 9 substantially comprises a pump 10 for circulating electrolyte E; a heat exchanger 11 and thermostatic valve 12 for controlling the temperature of electrolyte E entering electrochemical cell 7; and a gas separator 13 at the outlet of electrochemical cell 7, for separating from electrolyte E the hydrogen produced during the discharge reaction, and which presents a liquid phase outlet 14 and a gaseous phase outlet 15.

In use, system 9 communicates with the outside environment via an inlet 16 for admitting sea water into reservoir 8, and via an outlet 17 for expelling the hydrogen produced during the discharge reaction of the battery and, in particular operating conditions described later on for expelling electrolyte E.

Inlet 16 and outlet 17 are conveniently formed facing and coaxial with each other in a top and bottom portion respectively of lateral wall 4 of torpedo 2.

Finally, system 9 comprises a valve 18 interfacing with the outside environment, for selecting the operating mode of the device and hereinafter referred to simply as a "mode valve".

Mode valve 18 comprises a hollow body 19 defining an inlet conduit 20 communicating with inlet 16, and an outlet conduit 21 communicating with outlet 17; which conduits 20, 21 communicate with a central chamber 23 connected to the liquid phase outlet 14 of the gas separator, and are respectively connected, close to chamber 23, to the intake port 24 of pump 10 and to the gaseous phase outlet 15 of the gas separator.

Valve 18 also comprises closure members 25, 26 for inlet and outlet conduits 20, 21 respectively, for isolating battery 1 from the outside environment during storage; and a further closure member 27 for selectively isolating conduits 20, 21 from chamber 23 as described later on.

The above components of system 9 will now be described in more detail.

Pump 10 is driven by an electric d.c. motor 28 supplied by an auxiliary battery 29 during activation of battery 1, and by battery 1 itself when activated.

The delivery side 30 of pump 10 terminates directly inside reservoir 8 which is thus pressurized by pump 10.

Electrolyte E is fed into electrochemical cell 7 via thermostatic valve 12 which provides for mixing, in appropriate proportions, a stream of hot electrolyte E from reservoir 8, and a stream of electrolyte E cooled by heat exchanger 11. More specifically, valve 12 is a three-way valve, and presents an outlet 32 communicating with electrochemical cell 7 via a conduit 33; a first inlet 34 communicating directly with reservoir 8; and a second inlet 35 communicating with a conduit 36 extending through electrochemical cell 7 and communicating with a compartment 37 of reservoir 8, formed between cell 7 and adjacent wall 6. Compartment 37 forms the output manifold of heat exchanger 11 which comprises a number of longitudinal channels 38 formed on the inner face of lateral wall 4 enclosing cell 7, and which provide for feeding electrolyte E from reservoir 8 to compartment 37, and for effecting heat exchange between the electrolyte and outside sea water.

Conduit 33 for feeding electrolyte E into cell 7 is fitted inside with a diaphragm 44 designed to pierce at a predetermined relative pressure of, say, 3 bar; and, downstream from diaphragm 44, with a filter 42 for preventing the entry of foreign bodies into cell 7.

Thermostatic valve 12 comprises a casing 150 defining inlets 34, 35 and outlet 32; and a member 151 movable inside casing 150, for varying the section of the ports between each inlet 34, 35 and outlet 32.

More specifically, casing 150 is divided axially into four chambers 152, 153, 154, 155 separated respectively from the adjacent chamber by partitions 156, 157, 158. Chambers 152, 153, 154 present substantially the same cross section and communicate respectively with inlet 34, outlet 32 and inlet 35.

The intermediate chamber 153 communicates with chambers 152 and 154 via respective circular openings 168, 169 formed respectively in partitions 156, 157 and defining the ports between each inlet 34, 35 and outlet 32.

Chamber 152 communicates with reservoir 8 via a circular opening 170 formed in an end wall 171 of casing 150.

Chamber 155 presents a larger cross section than the others, and is adjacent to chamber 154 with which it communicates via a circular opening 172 formed in partition 158.

Openings 168, 169, 170, 172 are coaxial and present the same cross section.

Movable member 151 comprises a slide 173 presenting two cylindrical end portions 175, 176 housed in sliding and fluidtight manner in respective openings 170, 172; and a smaller-diameter, intermediate cylindrical portion 177 connected to cylindrical portions 175, 176 by respective truncated-cone-shaped portions 178.

Portion 175 is defined axially by a surface 175a subjected to the pressure in reservoir 8.

Movable member 151 also comprises an end piston 179 integral with and larger in diameter than cylindrical portion 176, and sliding in fluidtight manner inside chamber 155 which is divided by piston 179 into a substantially cylindrical first portion 180 extending between axial end surface 179a of piston 179 and end wall 181, opposite wall 171, of casing 150, and an annular second portion 182 extending between partition 158 and an annular surface 179b axially defining piston 179 towards slide 173 and surrounding cylindrical portion 176.

The area of surface 179b substantially equals the difference between the areas of surfaces 179a and 175a.

The temperature control device also comprises a solenoid valve 183 for hydraulically controlling displacement of movable member 151.

Solenoid valve 183 comprises a casing 184 housing a solenoid 185 and defining an axial cavity 186 housing a movable core 187 with a rod 187a for operating a ball shutter 188. Shutter 188 is housed inside a switch chamber 189 coaxial with cavity 186 and communicating with it via an opening 190 in which rod 187a slides in radially slack manner. Switch chamber 189 also communicates with reservoir 8 via an opening 191 facing opening 190, and with a first drive conduit 192 via a lateral outlet 193.

Core 187 axially defines a portion of cavity 186 communicating with opening 190 and defining a second chamber 194 of solenoid valve 183; which chamber 194 communicates permanently with a conduit 195 connected to inlet conduit 33 of cell 7, downstream from filter 42, and with a second drive conduit 196 defining a second outlet of solenoid valve 183.

First and second drive conduits 192, 196 are connected respectively to first portion 180 and second portion 182 of chamber 155 of valve 12, and provide for supplying said portions with respective hydraulic drive signals S1, S2.

Solenoid valve 183 also comprises a spring 197 interposed between core 187 and an end wall 198 of casing 184, and which, when the solenoid is de-energized, maintains core 187 in a forward position (FIG. 6) wherein ball shutter 188 cooperates in fluidtight manner with opening 191 to isolate switch chamber 189 from reservoir 8.

Solenoid valve 183 is driven by an electronic control unit 199 which supplies a control signal 200 to solenoid 185.

Figure 7:
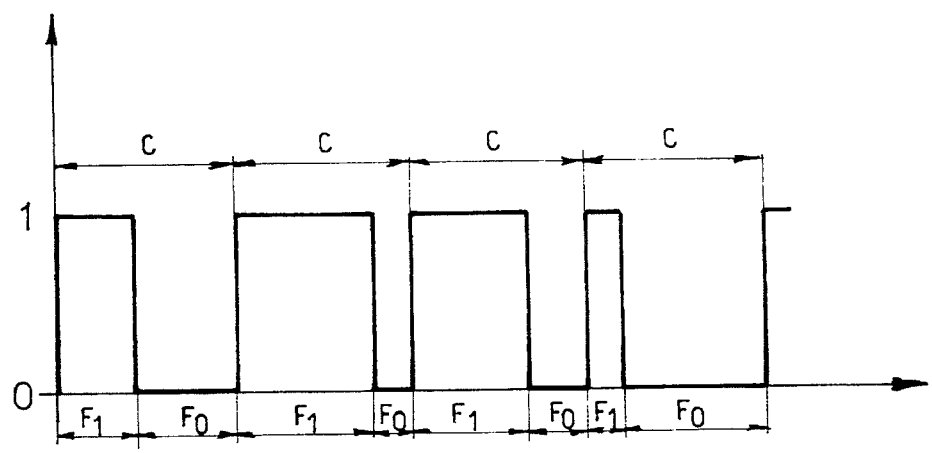
FIG. 7 shows a time graph of a control signal relative to the FIG. 6 detail.

More specifically, unit 199 comprises a processing and control circuit 204 supplied with a signal 205 from a temperature sensor 206 on conduit 33, and with a reference signal 207 proportional to a predetermined operating temperature of electrolyte E in cell 7, and generated by a central torpedo control unit (not shown). Circuit 204 generates an output signal 200, a time graph of which is shown by way of example in FIG. 7.

Signal 200 is a digital signal, and consists of a succession of closure cycles C of constant frequency, e.g. 3 Hz. Each cycle C therefore presents a fixed duration or period equal, for example, to ⅓ of a second, and comprises an active phase $F_1$ in which signal 200 presents a 1 level, and an idle phase $F_0$ in which signal 200 presents a 0 level.

Circuit 204 provides for varying the duty cycle of signal 200, i.e. the ratio between the duration of the active phase and the period, on the basis of a memorized map M which supplies the duty cycle value as a function of the error between signal 205, proportional to the temperature of electrolyte E detected by sensor 206, and reference signal 207.

Gas separator 13 presents a substantially cylindrical outer casing 45, the top and bottom ends of which are respectively connected tangentially to an inlet conduit 46 communicating with an electrolyte outlet of cell 7, and to liquid phase outlet 14. The gas is separated centrifugally in known manner: the thicker liquid phase occupies an outer annular portion 47 of the separator communicating with outlet 14, while the gaseous phase is collected in an inner portion 48 communicating with outlet 15.

Inlet conduit 46 of gas separator 13 communicates via small-section tubes 49 with a top portion of compartment 37, and with an opposite top portion of reservoir 8.

Figure 2:
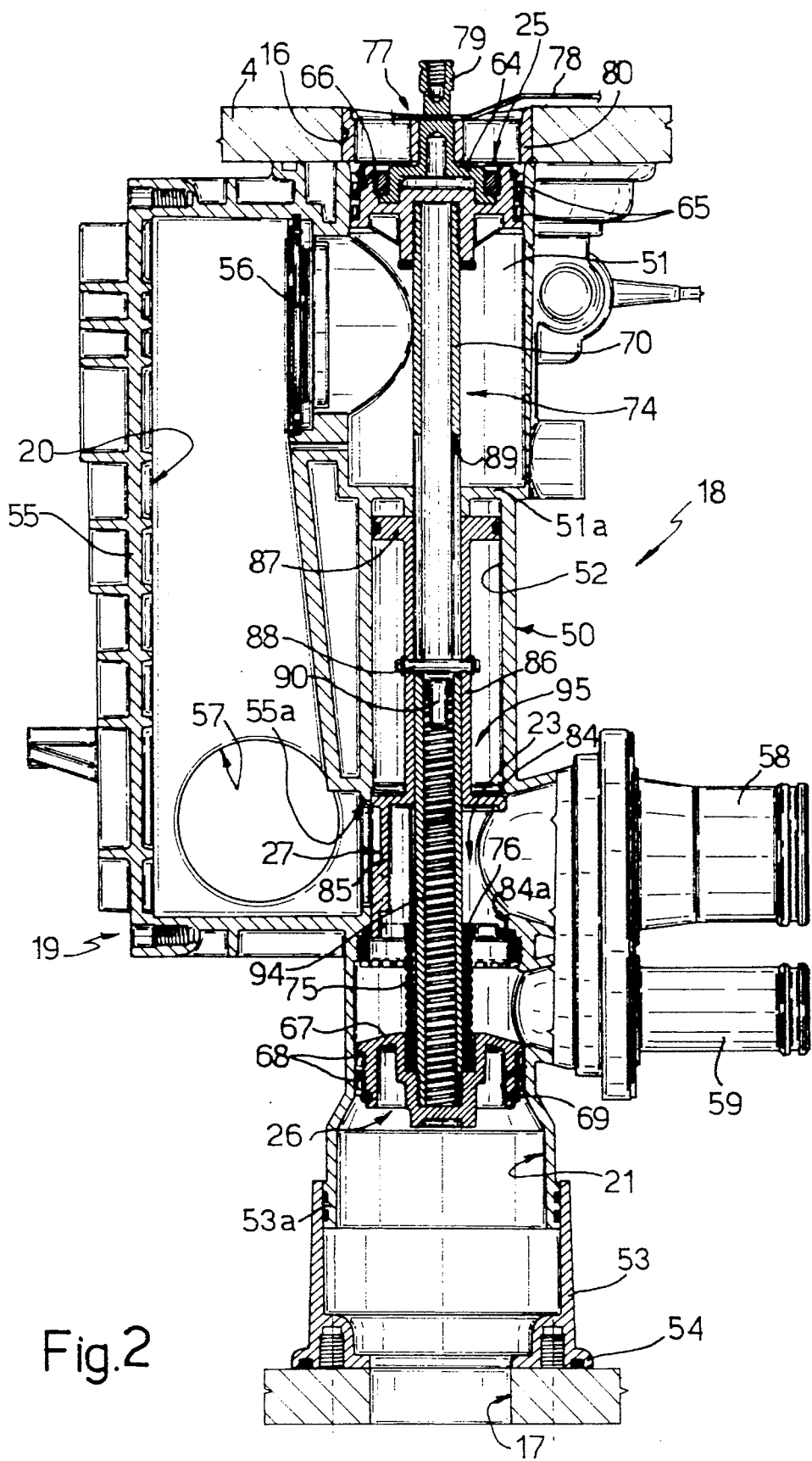
FIGS. 2, 3, 4 show larger-scale sections of a detail in FIG. 1 in different operating positions.
Figure 3:
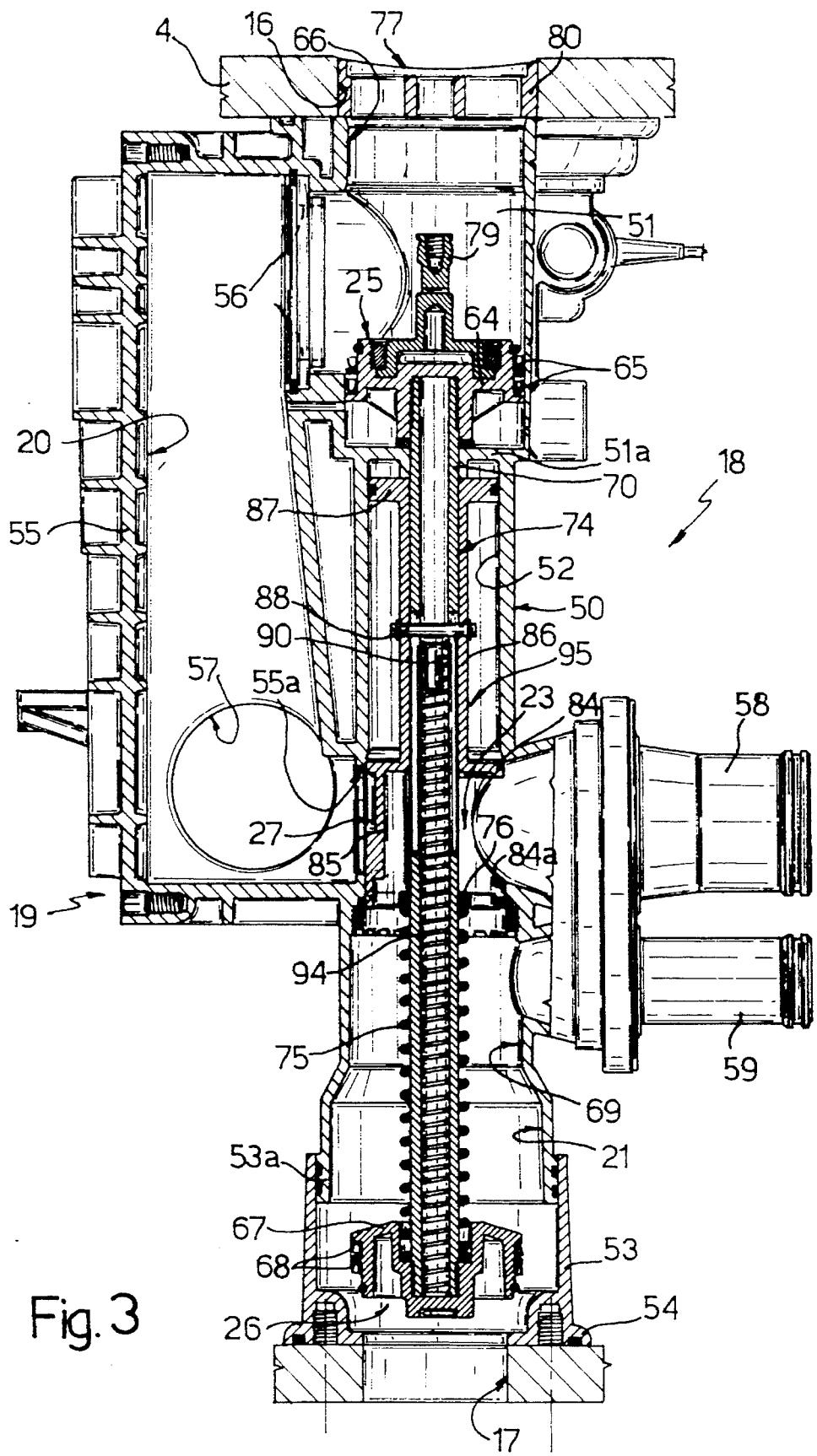
Figure 4:
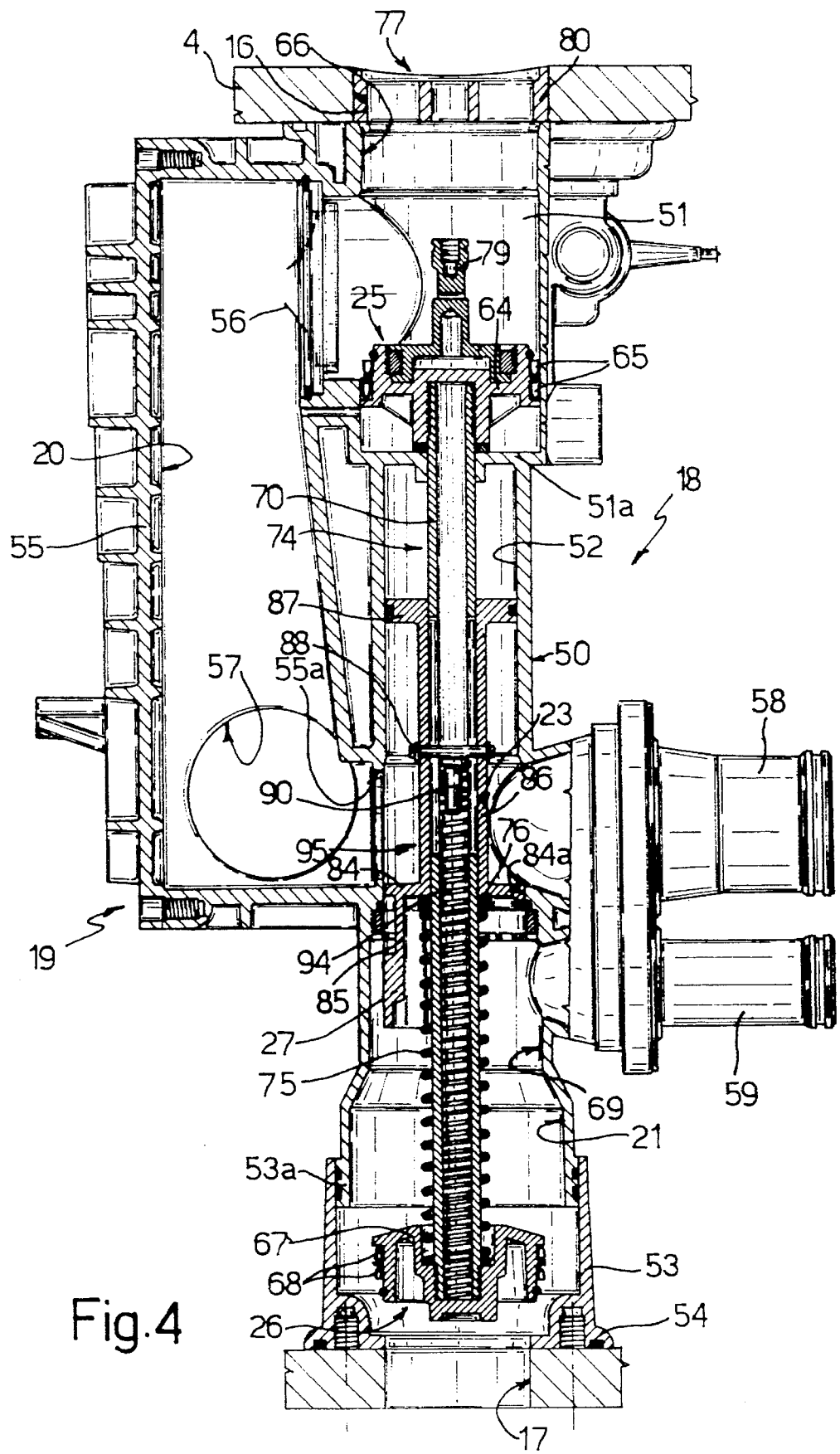

FIGS. 2, 3, 4 show mode valve 18 which is described in detail below.

Body 19 of mode valve 18 is conveniently made of plastic material resistant to electrolyte E, and comprises a first tubular element 50 with a straight axis, and extending crosswise to reservoir 8 from inlet 16 to outlet 17. More specifically, tubular element 50 comprises a top end portion 51 fixed at inlet 16, defining a first portion of inlet conduit 20, and defined at the bottom by a partition 51a separating it from an intermediate cylindrical chamber 52. Chamber 52 terminates at the bottom in a central portion of element 50 defining said chamber 23; and the bottom portion of element 50 defines a first portion of outlet conduit 21, and presents a larger-diameter end 53a connected to outlet 17 by a sleeve 53 connected telescopically in fluidtight manner to end 53a and fitted by an end flange 54 to wall 4 and about the periphery of outlet 17.

Body 19 also comprises a shaped second tubular element 55 with a substantially C-shaped axis, and which connects end portion 51 of first tubular element 50 to chamber 23 inside which it terminates via an opening 55a to define the remaining portion of inlet conduit 20.

The inlet of tubular element 55 is sealed by a diaphragm 56 pierceable by a predetermined small pressure difference, of the order of a few tenths of a bar, to prevent the untimely admission of sea water into system 9 as described below.

At the end connected to chamber 23, tubular element 55 defines a sleeve 57 for connection to the intake side 24 of pump 10.

Body 19 of mode valve 18 is connected to the liquid phase outlet 14 of gas separator 13 by a first sleeve 58 communicating with chamber 23, and to the gaseous phase outlet 15 of the separator by a second sleeve 59 communicating with outlet conduit 21 on the opposite side to tubular element 55.

Sleeves 58 and 59 house respective nonreturn valves 60, 61 (FIG. 1) for permitting flow from the gas separator to outlet conduit 21, and preventing flow in the opposite direction.

Closure member 25 of inlet conduit 20 comprises a circular plug 64 presenting peripheral seals 65 and cooperating in fluidtight manner with a seat 66 at the inlet of conduit 20 and immediately downstream from inlet 16. Similarly, closure member 26 of outlet conduit 21 comprises a circular plug 67 presenting peripheral seals 68 and cooperating in fluidtight manner with a seat 69 in conduit 21, immediately downstream from sleeve 59.

Plugs 64, 67 are coaxial with and face each other.

According to the present invention, plugs 64, 67 are connected to each other by a rigid tubular rod 70, and conveniently present the same cross section so that they are subjected to the same but opposite hydrostatic pressure when the torpedo is launched. Closure members 25, 26 and rod 70 thus combine to define a closure device 74 of mode valve 18, operating in conditions of hydrostatic equilibrium at any immersion depth.

Closure device 74 is movable axially between a closed position (FIG. 2) wherein closure members 25, 26 cooperate in fluidtight manner with respective seats 66, 69, and a lowered open position wherein closure members 25, 26 are respectively housed loosely in portion 51 of inlet conduit 20 and in sleeve 53 of outlet conduit 21.

Closure device 74 is subjected to the downward elastic pressure, i.e. towards the open position, generated by a helical spring 75 externally coaxial with rod 70 and compressed between plug 67 and a shoulder ring 76 fitted inside tubular element 50, between chamber 23 and outlet conduit 21; and is maintained in the closed position by an arming device 77 associated with plug 64.

Arming device 77 (FIG. 2) comprises a wire 78 connected transversely so as to slide in a rod 79 fitted to plug 64 and cooperating, by virtue of spring 75, with a spider type stop element 80 fitted by screws (not shown) inside inlet 16. Arming wire 78 is conveniently secured to the launching tube (not shown) so as to withdraw from rod 79 when the torpedo is fired, and so release closure device 74 of mode valve 18.

Closure member 27 of mode valve 18 comprises a disk 84 cooperating in fluidtight manner with a seat 84a interposed between chamber 23 and outlet conduit 21; and a wall 85 projecting integrally downwards from a peripheral portion of disk 84, and which opens and closes opening 55a between chamber 23 and inlet conduit 20. Closure member 27 is integral with a rod 86 externally coaxial with rod 70 and in turn integral with a hydraulic piston 87 sliding in fluidtight manner inside cylindrical chamber 52. Rod 86 is fitted with a transverse pin 88 engaging in sliding manner respective longitudinal slots 89 formed along opposite generating lines of rod 70, and which forms an upper axial stop for the end supporting element 90 of a helical spring 94 housed inside rod 70 and compressed between element 90 and plug 67.

Closure member 27, rod 86 and piston 87 combine to define a switching device 95 of mode valve 18, which device is movable between a raised position (FIGS. 2, 3) wherein wall 85 cooperates in fluidtight manner with opening 55a to isolate chamber 23 from inlet conduit 20, and a lowered position (FIG. 4) wherein disk 84 cooperates in fluidtight manner with seat 84a to isolate chamber 23 from outlet conduit 21, and chamber 23 communicates freely with inlet conduit 20.

Figure 5:
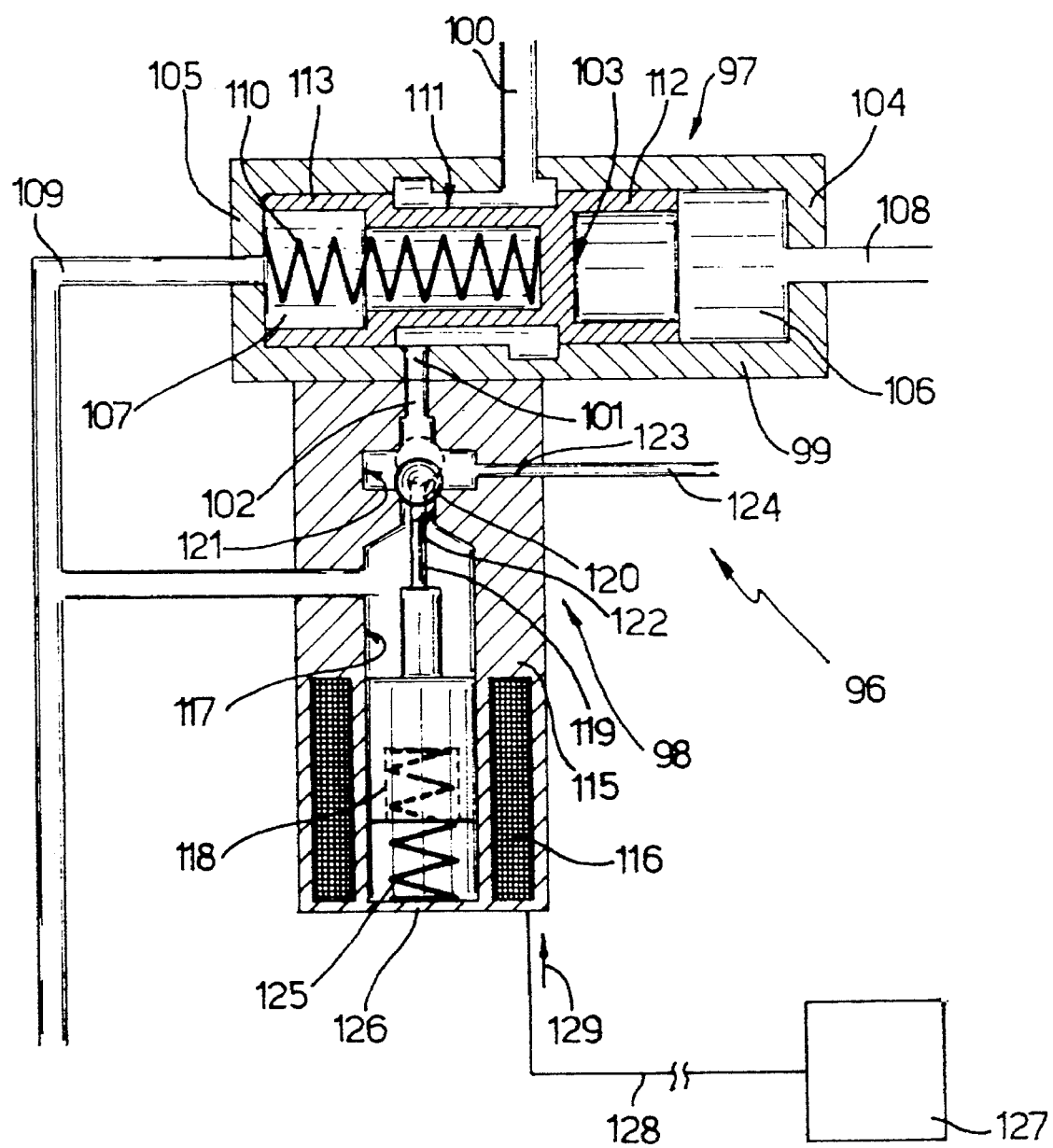
FIG. 5 shows a larger-scale schematic section of a further detail in FIG. 1.

Piston 87 is controlled hydraulically by an electrohydraulic device 96 shown schematically in FIG. 5.

Device 96 comprises a hydraulic sequence valve 97 and a solenoid valve 98 connected in series with each other.

Sequence valve 97 presents a tubular casing 99 in turn presenting an inlet 100 and an outlet 101 offset axially in relation to each other. Inlet 100 is connected to the inlet conduit 33 of cell 7, downstream from filter 42 (FIG. 1), and outlet 101 is connected to the inlet 102 of solenoid valve 98.

Casing 99 houses a piston 103 which, together with opposite end walls 104, 105, defines respective chambers 106, 107 connected by respective conduits 108, 109 to the outlet conduit 46 of cell 7 and to inlet conduit 20 (which is the lowest pressure point of the entire hydraulic circuit, with a pressure substantially equal to the external hydrostatic pressure).

A spring 110 is compressed between piston 103 and wall 105 of casing 99, for forcing piston 103 into an idle position (not shown) contacting wall 104.

Piston 103 presents a circumferential groove 111 extending between two cylindrical end portions 112, 113 cooperating in fluidtight manner with casing 99.

Piston 103 is movable between said idle position, wherein cylindrical portion 113 cooperates in fluidtight manner with outlet 101, and an activating position (FIG. 5) achieved when the pressure in chamber 106 exceeds the resultant of the pressure forces in chamber 107 and the elastic pressure of spring 110, and wherein groove 111 connects outlet 101 to inlet 100.

Solenoid valve 98 comprises a casing 115 housing a solenoid 116 and defining an axial cavity 117 housing a movable core 118 with a rod 119 controlling a ball shutter 120. Shutter 120 is housed in a switch chamber 121 coaxial with cavity 117 and communicating with it via an opening 122 in which rod 119 slides in radially slack manner. Inlet 102 of solenoid valve 98 communicates with switch chamber 121, and faces and is coaxial with opening 122. Switch chamber 121 also communicates with a lateral outlet 123 connected by a conduit 124 to chamber 52 of piston 87, close to partition 51a. Solenoid valve 98 also comprises a spring 125 interposed between core 118 and the end wall 126 of casing 115, and which, when the solenoid is de-energized, maintains core 118 in a forward position (FIG. 5) wherein shutter 120 cooperates in fluidtight manner with inlet 102 to isolate switch chamber 121 from sequence valve 97.

The solenoid is connected to a central torpedo control unit 127 over an electric line 128 by which it is supplied with an enabling signal 129 following a check cycle by the control unit of the operating conditions of the torpedo.

Anhydrous compound A is loaded into reservoir 8 following assembly of the battery. Reservoir 8 and electrochemical cell 7, however, are subjected beforehand to a process for eliminating any air inside them, and which comprises a number of vacuum and inert gas, e.g. nitrogen, filling cycles, to eliminate any trace of humidity which, during storage, may impair either the anhydrous electrolyte—by forming scale which is hard to dissolve—or the electrodes of the electrochemical cell, and also to eliminate any trace whatsoever of oxygen to prevent the formation of hydrogen during the discharge reaction.

To perform the above operations, reservoir 8 is accessed through outlet 17. In particular, sleeve 53 is detached from lateral wall 4, and is slid telescopically along outlet conduit 21 and inwards of the reservoir to form an opening between this and outlet 17; and anhydrous compound A is conveniently loaded by forming a vacuum inside the reservoir, and fitting outlet 17 with a vessel containing powdered anhydrous compound A which is thus sucked into the reservoir.

Operation of battery 1, and more specifically system 9, is as follows.

Prior to launching, mode valve 18 is set to the FIG. 2 configuration, wherein closure device 74 is closed by arming device 77; and activating device 96 is idle due to the absence of pressure in conduit 33, so that closure member 27 is raised to connect both outlets of gas separator 13 to outlet conduit 21.

When the torpedo is launched, removal of arming wire 78 and the thrust exerted by spring 75 switch closure device 74 of mode valve 18 from the FIG. 2 to the FIG. 3 position wherein inlet conduit 20 and outlet conduit 21 communicate with the outside environment; and diaphragm 56 prevents any untimely admission of water, e.g. due to spray, until the torpedo is immersed and the pressure at the inlet exceeds the piercing threshold of the diaphragm. Any water entering conduit 21 is ineffective, by virtue of nonreturn valves 60, 61 preventing it from reaching gas separator 13 and electrochemical cell 7.

The incoming water from inlet conduit 20 flows to pump 10 by which it is fed into reservoir 8 where it begins to dissolve anhydrous compound A to form liquid electrolyte E; electrolyte E fills reservoir 8 and, via channels 38 of exchanger 11, compartment 37; and the gas in reservoir 8 and compartment 37 forms a pocket at the top from which it is expelled by tubes 49, gas separator 13, nonreturn valves 60, 61 and outlet conduit 21.

Electrolyte E also flows into inlet conduit 33 of cell 7 through thermostatic valve 12 (operation of which is described later on), but is prevented by diaphragm 44 from entering cell 7 until reservoir 8 fills up and the pressure of electrolyte E exceeds the piercing threshold of diaphragm 44, at which point the electrolyte flows into cell 7 through filter 42.

As it fills up, the gas inside cell 7 is expelled by conduit 46, gas separator 13 and outlet conduit 21; and when cell 7 is filled completely with electrolyte E, the pressure in conduit 46 increases and, via conduit 108, switches valve 97 to the FIG. 5 position. In the presence of electric enabling signal 129, solenoid valve 98 is also set to the FIG. 5 position, so that chamber 52 of piston 87 is connected to electrolyte inlet conduit 33 of cell 7 and therefore pressurized.

Piston 87 moves closure member 27 downwards in opposition to spring 94 (FIG. 4), so as to connect the liquid phase outlet 14 of gas separator 13 to the bottom end of inlet conduit 20 and hence to the intake side 24 of pump 10, as opposed to outlet conduit 21, thus resulting in closed-loop operation of system 9. More specifically, electrolyte E pressurized by pump 10 is fed into cell 7 by thermostatic valve 12, partly from reservoir 8 directly, and partly through heat exchanger 11, the proportions depending on actual operating conditions and the required operating temperature of the battery; from cell 7, in which the discharge reaction is produced, generating electric energy, heat, and reaction products (mainly hydrogen and aluminates), electrolyte E flows along conduit 46 into gas separator 13 where the gaseous phase is almost entirely separated from the liquid phase and expelled through outlet 15; and the electrolyte E cleansed of the gaseous phase issues from separator 13 through outlet 14 and is fed back to pump 10 via mode valve 18.

Under normal operating conditions, no sea water enters and no electrolyte E issues from inlet conduit 20, by virtue of the electrolyte intake of pump 10 being equal to the amount of electrolyte fed back to the pump from gas separator 13; and the permanent connection between the sea and system 9 via inlet conduit 20 presents the advantage of enabling the battery to operate under balanced pressure conditions, so that the mechanical components, in particular lateral wall 4 and the components of circulating device 9, are subjected to only small differences in pressure and as such may be reduced in weight.

An increase in the concentration of reaction products, typically aluminates, results in an increase in the internal resistance, and hence a reduction in the voltage, of the battery, and an excessive accumulation of such products may even arrest the discharge reaction.

When the battery voltage reaches a minimum threshold value, central control unit 127 de-energizes solenoid 116 of valve 98 which connects chamber 52 of piston 87 to low-pressure conduit 109 so as to restore switching device 95 to the raised position wherein the liquid phase outlet 14 of the gas separator communicates with outlet conduit 21.

In this condition, or drain mode, the electrolyte E polluted by the reaction products is drained off into the sea and replaced by fresh sea water drawn in via conduit 20; and, upon the control unit detecting an acceptable battery voltage value, solenoid valve 98 is again energized to restore the closed-loop operating mode described above.

If the underwater system is salvaged at the end of the mission, the battery must be deactivated.

This is done by again switching mode valve device 95 to the open-loop configuration described above, until all the electrolyte E has been drained off and replaced with sea water, and the battery has been washed.

A more detailed description will now be given of the temperature control of electrolyte E fed into electrochemical cell 7.

Figure 6:
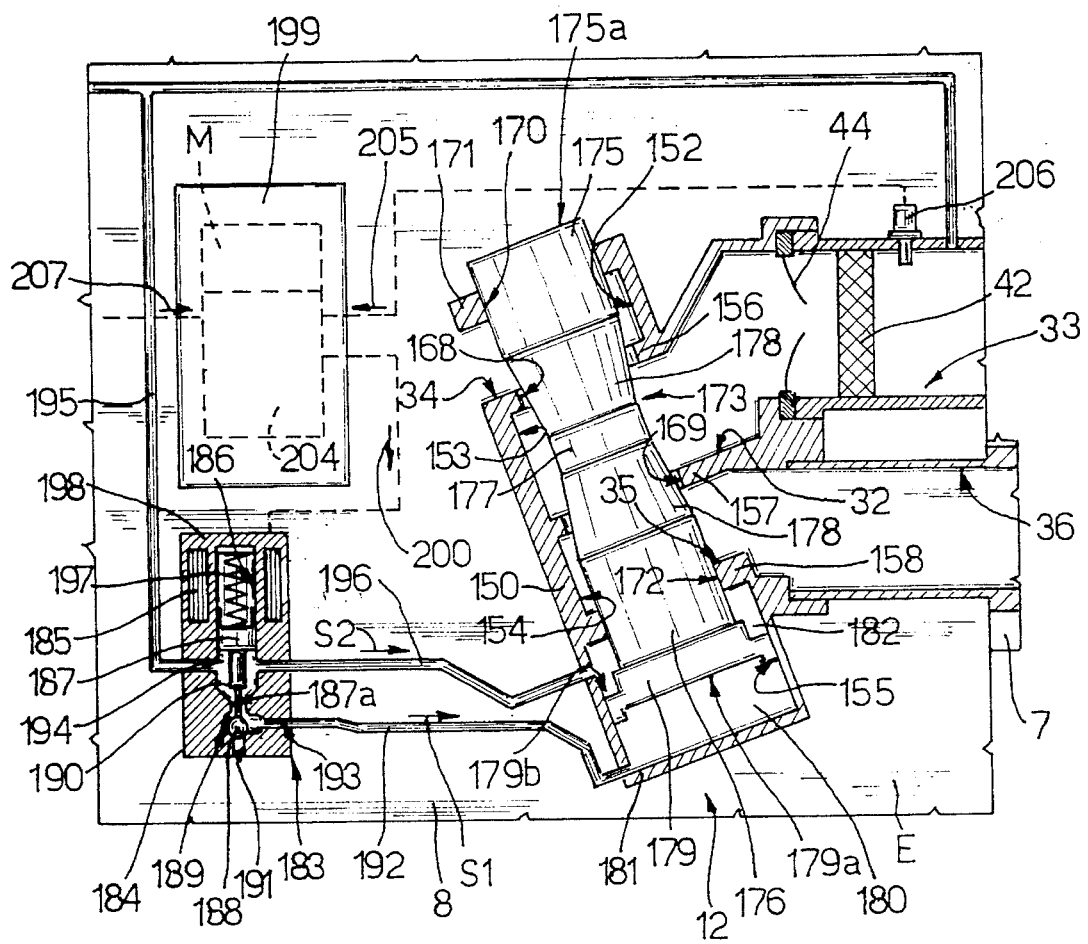
FIG. 6 shows a larger-scale schematic section of a further detail in FIG. 1.

When signal 200 controlling solenoid valve 183 is idle (phases $F_0$), solenoid valve 183 is set to the FIG. 6 configuration wherein it connects both drive conduits 192, 196 to conduit 195; movable member 151 is subjected to the reservoir pressure on surface 175a, and to the pressure of conduit 33 on surfaces 179a, 179b of piston 179; the resultant of the pressure forces on piston 179 is equivalent to the pressure of conduit 33 on a drive surface of an area equal to the difference between the areas of surfaces 179a, 179b, i.e. the area of surface 175a; and, as the pressure of conduit 33 is lower than that of reservoir 8, due to the load losses through valve 12, movable member 151 moves towards wall 181, thus increasing the section of the opening between outlet 32 and second inlet 35 ("cold" electrolyte) of valve 12, and reducing the section of the opening between outlet 32 and first inlet 34 ("hot" electrolyte).

Conversely, when signal 200 is active, portion 180 of chamber 155 is connected to reservoir 8 via conduit 192 and opening 191; the resultant of the pressure forces on surfaces 179a, 175a therefore equals the reservoir pressure on an area equal to the difference between the areas of surfaces 179a, 175a, i.e. the area of surface 179b; and, as surface 179b continues to be subjected to the pressure of conduit 33, which is lower than that of reservoir 8, movable member 151 moves away from wall 181, thus increasing the section of the opening between outlet 32 and first inlet 34, and reducing the section of the opening between outlet 32 and second inlet 35.

The time pattern of signal 200 (FIG. 7) is such that movable member 151 of valve 12 oscillates continually, and more specifically performs a succession of oscillating cycles at constant frequency, each comprising a movement in one and then the other direction; which movements present the same duration (and hence amplitude) in the event the temperature of electrolyte E detected by sensor 206 equals the reference temperature, and no change is required in the (mean) position of movable member 151. In this case, the control unit generates a signal 200 with a duty cycle of 0.5. More generally speaking, said movements present different durations (and amplitudes) respectively proportional to the duty cycle of signal 200 and to its complement of 1, so as to shift the (mean) position of movable member 151 in such a manner as to increase the opening between outlet 32 and one of inlets 34, 35 to correct the detected difference in temperature.

The advantages of the battery according to the teachings of the present invention will be clear from the foregoing description.

In particular, being opposed and rigidly connected to each other, closure members 25, 26 are subjected to balanced hydrostatic pressures; closure device 74 therefore operates in a state of hydrostatic equilibrium at any immersion depth; and opening of the inlet and outlet conduits to activate the battery is in no way impeded by hydrostatic pressure. As such, the battery is equally suitable, with no loss in performance, for fitment to both surface- and deep-sea-launched, e.g. submarine launched, underwater systems.

Moreover, opening of inlet and outlet conduits 20, 21 involves no component breakage or fragmentation, and no expulsion of components or fragments outwards of the system, and is achieved by simply moving closure members 25, 26 to an open position within the confines of the system, thus eliminating any possibility of damage to or jamming of the launching tube.

A further advantage of the battery according to the present invention is the highly compact design of the mode valve, which incorporates the inlet and outlet conduits, the closure device, the fittings for connection to the circulating pump and to the gas separator outlets, and the device for switching from open- to closed-loop operating mode.

Moreover, when the battery is activated, the switch from open- to closed-loop operating mode effected sequentially upon detection of correct operating conditions (fill-up of the battery and enabling signal from the control unit).

Finally, the telescopic connection of outlet conduit 21 to outlet 17 provides for fast, troublefree, low-cost loading of the anhydrous electrolyte.

Clearly, changes may be made to battery 1 as described and illustrated herein without, however, departing from the scope of the present invention.

In particular, the preliminary operations—vacuum and nitrogen fill process, and loading of the anhydrous electrolyte—may be performed through an opening in the reservoir wall, in which case, telescopic sleeve 53 may be dispensed with.

In addition to the conditions described above, the mode valve may also be switched to drainage mode by the central control unit for effecting a mission stage switch, e.g. for switching to high-speed mode equally requiring aluminate removal.

Finally, electronic control of the thermostatic valve provides for setting as required the temperature of electrolyte E supplied to the electrochemical cell, as well as for setting a number of values to define an appropriate in-mission discharge profile, by simply varying reference signal 207; which values may even be modified automatically by the central control unit in the course of the mission, for optimizing discharge conditions and hence power output and/or discharge time. Temperature control of electrolyte E is also highly accurate, and presents a rapid response; the use of a continually oscillating movable member 151 provides for eliminating pull-away friction which is one of the major dynamic problems of traditional controls; the absence of actuators connected mechanically to movable member 151 provides for extremely flexible positioning of the temperature control system components which are connected solely by means of conduits or cables; and, finally, the temperature control device itself is extremely cheap to produce by virtue of employing a straightforward closure solenoid valve.

We claim:

1. An electrolyte-activated battery (1), particularly for generating electric energy for the propulsion of underwater systems, and comprising:

an electrochemical cell (7);

a reservoir (8) containing at least one anhydrous alkaline compound (A) dissolvable in sea water to form a liquid electrolyte (E); and a system (9) for forming and circulating the liquid electrolyte (E) between the reservoir (8) and the electrochemical cell (7); said system (9) in turn comprising:

an inlet conduit (20) communicating with the outside environment;

a pump (10) for circulating the electrolyte (E), and connected at an intake side to the inlet conduit (20), and at an delivery side to the reservoir (8);

electrolyte temperature regulating means (11, 12, 183, 199) interposed between the reservoir (8) and an inlet (33) of the electrochemical cell (7);

a gas separator (13) presenting an inlet connected to an outlet of the electrochemical cell (7); a gaseous phase outlet (15); and a liquid phase outlet (14);

an outlet conduit (21) communicating with the outside environment;

a first closure member (25) for the inlet conduit (20), and a second closure member (26) for the outlet conduit (21), which members (25, 26) provide for isolating the battery (1) from the outside environment during storage;

the liquid phase outlet (14) of the gas separator (13) being connectable to the intake side (24) of the pump (10); and the gaseous phase outlet (15) of the gas separator ( 13 ) being connected to the outlet conduit (21);

characterized in that said battery comprises rigid connecting means (70) between said first (25) and said second (26) closure members said closure members (25, 26) defining, with said rigid connecting means (70), a closure device (74) movable between a position wherein it closes and a position wherein it opens said inlet and outlet conduits (20, 21); and said closure members (25, 26) being subjected to opposite hydrostatic pressures.

2. A battery as claimed in claim 1, characterized in that said inlet conduit (20) and said outlet conduit (21) communicate with the outside environment via respective openings (16, 17) formed opposite each other in a lateral wall (4) of said reservoir (8).

3. A battery as claimed in claim 1, characterized in that said first closure member (25) and said second closure member (26) face and are coaxial with each other; said connecting means comprising a rod (70).

4. A battery as claimed in claim 1, characterized in that, when said closure device (74) is in said opening position, said closure members (25, 26) are housed inside said respective conduits (20, 21).

5. A battery as claimed in claim 1, characterized in that said battery comprises an arming device (77) cooperating removably with said closure device (74), for maintaining said closure device in said closing position; and first elastic means (75) forcing said closure device (74) towards said opening position.

6. A battery as claimed in claim 1, characterized in that said battery comprises a switching device (95) for selectively connecting said liquid phase outlet ( 14 ) of said gas separator (13) to said inlet conduit (20) and to said outlet conduit (21).

7. A battery as claimed in claim 6, characterized in that said switching device (95) comprises a third closure member (27) movable between a first position wherein it is interposed between said liquid phase outlet (14) of said gas separator (13) and said inlet conduit (20), and a second position wherein it is interposed between said liquid phase outlet (14) of said gas separator (13) and said outlet conduit (21); and actuating means (87) for controlling said third closure member (27).

8. A battery as claimed in claim 7, characterized in that said actuating means comprise a hydraulic piston (87) connected to said third closure member (27) and which provides for moving said third closure member (27) from said first to said second position in opposition to second elastic means (94).

9. A battery as claimed in claim 8, characterized in that said battery comprises an electrohydraulic control device (96) for controlling said switching device (95); said control device (96) connecting an operating chamber of said piston to a conduit (100) supplying electrolyte (E) pressurized by said pump, in the presence of an electric enabling signal (129) supplied by an electronic control unit (127), and in the presence of a hydraulic signal (108) derived from the outlet conduit (46) of said electrochemical cell (7) and indicating the cell (7) has been filled completely with said electrolyte (E).

10. A battery as claimed in claim 9, characterized in that said piston (87) of said switching device (95) is coaxial with said rod (70) of said closure device (74); and said second elastic means comprise a spring (94) housed inside said rod (70).

11. A battery as claimed in claim 1, characterized in that said outlet conduit (21) comprises telescopic means (53) connected removably to said outlet opening (17).

12. A battery as claimed in claim 6, characterized in that said battery comprises a mode valve (18) incorporating said closure device (74) and said switching device (95); said mode valve (18) comprising an outer body (19) housed in said reservoir (8) and defining said inlet conduit (20) and said outlet conduit (21), and which presents fastening means (57, 58, 59) for connection to said pump (10) and to said outlets (14, 15) of said gas separator (13); said closure device (74) and said switching device (95) being housed in said outer body (19).

13. A battery as claimed in claim 1, characterized in that said battery comprises small-diameter tubes (49) connecting opposite upper portions of said reservoir (8) to said inlet of said gas separator (13).

14. A battery as claimed in claim 1, characterized in that said electrolyte temperature regulating means (11, 12, 183, 199) comprise a heat exchanger (11) communicating at the inlet with said reservoir (8) and employing sea water as a cooling fluid; a three-way thermostatic valve (12) presenting a first inlet (34) connected to said reservoir (8), a second inlet (35) connected to the outlet (37) of said heat exchanger (11), an outlet (32) connected to the inlet of said electrochemical cell (7), and a movable member (151) for varying the section of the openings between said inlets (34, 35) and said outlet (32) of the thermostatic valve; and control means (199, 183) for controlling said thermostatic valve (12); said control means comprising a two-position solenoid valve (183) generating at least one hydraulic signal (S1) for driving said thermostatic valve (12), a sensor (206) for detecting the temperature of the electrolyte (E), and an electronic control unit (199) connected to said temperature sensor (206) and to said solenoid valve (183), and generating at least one digital signal (200) for controlling said solenoid valve (183) in response to at least one input signal (205) from said sensor; said solenoid valve (183) assuming a first and second position corresponding respectively to a first and second level (1, 0) of said digital control signal (200), and wherein said hydraulic drive signal (S1) provides for moving said movable member (151) in such a manner as to increase the section of the opening between said outlet (32) and said first and second inlets (34, 35) respectively of said thermostatic valve (12).

15. A battery as claimed in claim 14, characterized in that said control signal (200) comprises a succession of cycles (C) of constant duration, each comprising an active phase ($F_1$) wherein the signal (200) assumes said first level (1), and an idle phase ($F_0$) wherein said signal assumes said second level (0); said control unit (199) comprising comparing means (204) for comparing and determining the error between said input signal (205) and a reference temperature signal (207); and means (M) for varying the duty cycle of said control signal (200) as a function of said error.

16. A battery as claimed in claim 14, characterized in that said movable member (151) comprises a first (175a) and second (179a) drive surface opposite each other and subjected respectively to the pressure in said reservoir (8) and the pressure of said drive signal (S1).

17. A battery as claimed in claim 16, characterized in that said solenoid valve (183) comprises an outlet (193) selectively connectable to said reservoir (8) and to a point (33) of electrolyte forming and circulating system (9) presenting a lower pressure than said reservoir (8); said outlet (193) supplying said drive signal (S1) for driving said thermostatic valve (12).

18. A battery as claimed in claim 17, characterized in that said solenoid valve (183) comprises a second outlet (196) connected permanently to said point (33) of said electrolyte forming and circulating system (9) presenting a lower pressure than said reservoir (8), and to said thermostatic valve (12); said movable member (151) comprising a third drive surface (179b) presenting an area substantially equal to the difference between the areas of said second (179a) and first (175a) drive surfaces, and subjected to the pressure of said second outlet (196); and the pressures on said first (175a) and third (179b) drive surfaces acting in the same direction.

19. A battery as claimed in claim 18, characterized in that said movable member (151) comprises a slide (173) and an end piston (179); said second and third drive surfaces (179a, 179b) consisting of surfaces axially defining said piston (179) at one end and towards said slide (173) respectively; and said first drive surface (175a) consisting of an axial end surface of said slide (173) opposite said piston (179).

20. A battery as claimed in claim 17, characterized in that said point of said electrolyte forming and circulating system (9) presenting a lower pressure than said reservoir (8) is located at the inlet (33) of said electrochemical cell (7).

* * * * *